(12) United States Patent
Chow et al.

(10) Patent No.: US 9,497,178 B2
(45) Date of Patent: *Nov. 15, 2016

(54) GENERATING CHALLENGE RESPONSE SETS UTILIZING SEMANTIC WEB TECHNOLOGY

(71) Applicant: International Business Machines Corporation, Armonk, NY (US)

(72) Inventors: Ken Y. Chow, Singapore (SG); Weng S. Tang, Singapore (SG); Liang Xu, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/144,781

(22) Filed: Dec. 31, 2013

(65) Prior Publication Data
US 2015/0188898 A1 Jul. 2, 2015

(51) Int. Cl.
*H04L 29/06* (2006.01)
*G06F 21/31* (2013.01)

(52) U.S. Cl.
CPC ............... *H04L 63/08* (2013.01); *G06F 21/31* (2013.01); *G06F 2221/2101* (2013.01); *G06F 2221/2103* (2013.01)

(58) Field of Classification Search
CPC .............................. H04L 63/08; G06F 21/316
See application file for complete search history.

(56) References Cited

U.S. PATENT DOCUMENTS

| 7,490,094 | B2 * | 2/2009 | Bamba ............... G06F 17/30864 |
| 7,624,007 | B2 | 11/2009 | Bennett |
| 7,840,806 | B2 | 11/2010 | Hammond et al. |
| 7,961,883 | B2 | 6/2011 | Bajar et al. |
| 8,060,390 | B1 | 11/2011 | Overstreet |
| 8,112,431 | B2 | 2/2012 | Gu et al. |
| 8,132,265 | B2 | 3/2012 | Wootton et al. |

(Continued)

FOREIGN PATENT DOCUMENTS

CN 103248620 A 8/2013

OTHER PUBLICATIONS

Authors: Chow, Liang, Tang; "Semantically Generated Challenge-Response for Zero Knowledge Proof"; Publisher: IBM; Date: Jun. 12, 2012; pp. 1-10.*

(Continued)

*Primary Examiner* — Hadi Armouche
*Assistant Examiner* — Andrew Steinle
(74) *Attorney, Agent, or Firm* — Trentice V. Bolar

(57) ABSTRACT

Embodiments of the present invention relate to generating challenge response sets utilizing semantic web technology. In response to detecting an authentication session for a user, a computing device generates a first challenge question that is semantically related to a second challenge question previously responded to by the user, wherein the authentication session seeks to validate an identification of the user. The computing device determines whether a response to the challenge question by the user is valid. In response to determining that the response to the challenge question by the user was valid, the computing device generates a third challenge question or a notification that the response to the challenge question validates the identification of the user.

6 Claims, 4 Drawing Sheets

(56) References Cited

U.S. PATENT DOCUMENTS

| | | | |
|---|---|---|---|
| 8,401,522 B2 | 3/2013 | Crawford et al. | |
| 8,706,653 B2 | 4/2014 | Kasneci et al. | |
| 2004/0123156 A1* | 6/2004 | Hammond, II | H04L 9/0891 726/4 |
| 2004/0143710 A1 | 7/2004 | Walmsley | |
| 2005/0171851 A1 | 8/2005 | Applebaum et al. | |
| 2006/0271304 A1 | 11/2006 | He et al. | |
| 2008/0086759 A1* | 4/2008 | Colson | G06F 21/34 726/2 |
| 2008/0243811 A1 | 10/2008 | He et al. | |
| 2008/0294637 A1 | 11/2008 | Liu | |
| 2009/0106134 A1* | 4/2009 | Royyuru | G06Q 20/40 705/35 |
| 2009/0241201 A1 | 9/2009 | Wootton et al. | |
| 2009/0288150 A1* | 11/2009 | Toomim et al. | 726/5 |
| 2009/0320093 A1 | 12/2009 | Glazier et al. | |
| 2010/0049766 A1 | 2/2010 | Sweeney | |
| 2010/0114776 A1 | 5/2010 | Weller et al. | |
| 2010/0115436 A1 | 5/2010 | Embley et al. | |
| 2010/0153862 A1* | 6/2010 | Schreiber | 715/760 |
| 2010/0190145 A1* | 7/2010 | Singer | G09B 7/04 434/335 |
| 2010/0257028 A1* | 10/2010 | Hillerbrand | 705/10 |
| 2010/0332514 A1 | 12/2010 | Steele et al. | |
| 2011/0154217 A1 | 6/2011 | Thomas et al. | |
| 2011/0191838 A1 | 8/2011 | Yanagihara | |
| 2012/0054834 A1 | 3/2012 | King | |
| 2013/0035167 A1 | 2/2013 | Angelakis et al. | |
| 2013/0144786 A1* | 6/2013 | Tong et al. | 705/44 |
| 2014/0006507 A1* | 1/2014 | Carter | H04L 12/585 709/204 |
| 2014/0012882 A1 | 1/2014 | Poppitz | |
| 2014/0012892 A1 | 1/2014 | Jaudon | |
| 2014/0080110 A1 | 3/2014 | Nguyen | |
| 2014/0149432 A1 | 5/2014 | Chilana et al. | |
| 2015/0143487 A1 | 5/2015 | Nathan | |

OTHER PUBLICATIONS

U.S. Appl. No. 14/479,813, entitled "Generating Challenge Response Sets Utilizing Semantic Web Technology", filed Sep. 8, 2014.

Chow et al., "Semantically Generated Challenge-Response for Zero Knowledge Proof", Document Version: 1.0, Jun. 12, 2013.

Security and Risk Management Blog, "Mitt Romney Email Hack Shames Hotmail", Jun. 5, 2012, <https://www.ibm.com/developerworks/mydeveloperworks/blogs/f2b0>.

Wikipedia, "Sarah Palin email hack", retrieved on Jul. 2, 2013 from website: <http://en.wikipedia.org/wiki/Sarah-Palin_email_hack>.

International Application No. PCT/CN2014/088827, Written Opinion of the International Searching Authority, Patent Cooperation Treaty, International filing date Oct. 17, 2014.

International Application No. PCT/CN2014/088827, Patent Cooperation Treaty, International Search Report, International filing date Oct. 17, 2014.

* cited by examiner

GENERATING CHALLENGE RESPONSE SETS UTILIZING SEMANTIC WEB TECHNOLOGY

BACKGROUND

The present disclosure relates generally to the field of cryptography, and more particularly to generating challenge response sets utilizing semantic web technology.

Security challenge and response authentication is commonly employed to verify user identity. In most cases, if a user forgets their username and/or password, a set of challenge questions is posed to the user (e.g. What is the model of your first car?) and the user is expected to provide the correct answer based on his personal history. The answer to these security challenges are usually provided when a user signs up for a service.

Typically, sensitive and specific personal questions are posed for the challenge-response set due to the unlikelihood that unauthorized individual would provide the same response for a particular challenge. However, the same challenge questions are employed and users usually insert the same answers as the response, which may be a security concern, as a compromise of the answer at a single instance could potentially lead to subsequent issues at other instances.

SUMMARY

Embodiments of the present invention relate to generating challenge response sets utilizing semantic web technology. In response to detecting an authentication session for a user, a computing device generates a first challenge question that is semantically related to a second challenge question previously responded to by the user, wherein the authentication session seeks to validate an identification of the user. The computing device determines whether a response to the challenge question by the user is valid. In response to determining that the response to the challenge question by the user was valid, the computing device generates a third challenge question or a notification that the response to the challenge question validates the identification of the user.

DETAILED DESCRIPTION

Figure 1:
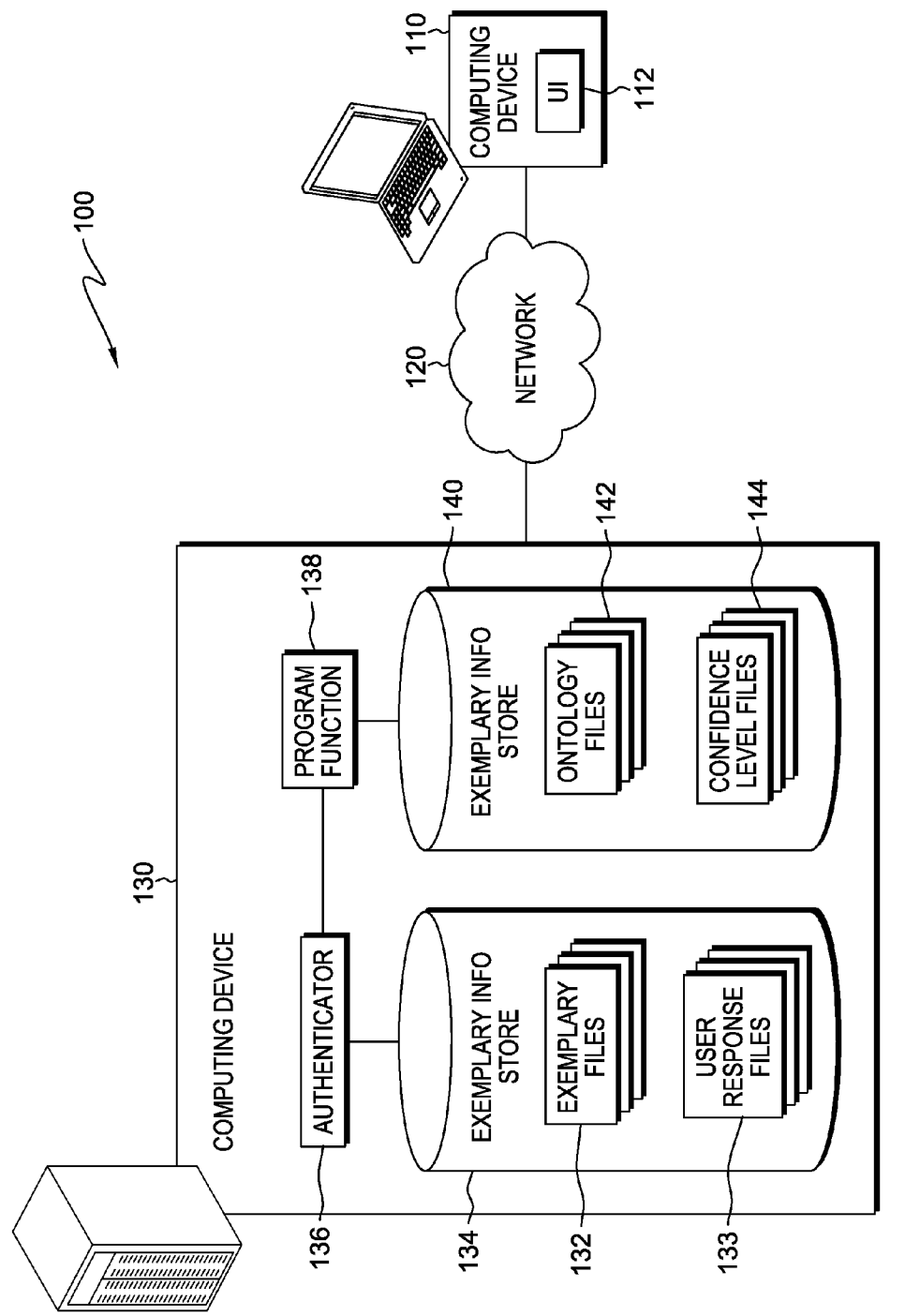
FIG. 1 is a block diagram illustrating an environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (hereinafter "EPROM" or "Flash memory"), an optical fiber, a portable compact disc read-only memory (hereinafter "CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® or the like and conventional procedural programming languages, such as the "C" programming language or similar programming languages. The program code may execute entirely on a user's computer, partly on the user's computer, as a stand-alone software package and partly on a remote computer or entirely on the remote computer or server. In the latter scenario, the remote computer may be connected to the user's computer through any type of network, including a local area network (hereinafter "LAN") or a wide area network (hereinafter "WAN"), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Security challenge and response authentication is commonly employed to verify user identity. In most cases, if a user forgets their username and/or password, a set of challenge questions is posed to the user (e.g. What is the model of your first car?) and the user is expected to provide the correct answer based on his personal history. The answer to these security challenges are usually provided when a user signs up for a service. Embodiments of the present invention seek to generate an alternative challenge and response set through the use of semantic web technology. The generated set is related semantically to the original user response and does not directly translate back to the original user response.

Assuming that the user's response is a valid ontology object, an ontology database can be queried for the object, which has associated properties and classes. Based on the properties and classes of a particular object, a data generalization strategy can be used to generate a new-challenge response set. As a user reiterates through this process n-times, a confidence level may be reached that that it is highly unlikely to be based on chance.

Embodiments of the present invention will now be described in detail with reference to the Figures. FIG. 1 is a block diagram illustrating an environment, generally designated 100, in accordance with one embodiment of the present invention. Environment 100 enables authorized users to access protects information subsequent to successfully answering challenge questions, wherein the challenge question is associated with a user's response to security challenge questions that were provided by the user upon signing up for a related service. Environment 100 includes computing devices 110 and 130, all interconnected over network 120. Network 120 can be, for example, a local area network (hereinafter "LAN"), a wide area network (hereinafter "WAN") such as the Internet, or a combination of the two, and can include wired, wireless, or fiber optic connections. In general, network 120 can be any combination of connections and protocols that will support communications between computing devices 110 and 130.

In various embodiments of the present invention, computing devices 110 and 130 may be laptop computer, tablet computer, netbook computer, personal computers (hereinafter "PCs"), desktop computers, personal digital assistants (hereinafter "PDAs"), or smart phones. In other embodiments, computing device 110 and 130 are included in a distributed computing system. Computing device 110 is a computing device that is used to respond to challenge questions to gain access to protected information stored on another computing device, in accordance with an embodiment of the present invention. Computing device 110 includes user interface 112, which is used to access and/or manipulate information stored on computing device 130.

Computing device 130 is a computing device that includes protected information that can only be accessed by authorized individuals, in accordance with an embodiment of the present invention. Computing device 130 includes exemplary information store 134, authenticator 136, exemplary information store 140 and program function 138. Exemplary information store 134 is an information repository that is in communication with authenticator 136 and includes exemplary files 132 as well as user response files 133. Exemplary files 132 include protected information that can only be accessed by authorized individuals after verifying their identification in response to successfully responding to one or more program function challenge questions, such as those challenge questions generated by program function 138. User response files 133 include information that reflects user responses to the initial challenge questions there present to the user during the account setup stage.

Authenticator 136 is included in computing device 130 and is in communication with exemplary information store 134 and program function 138. Authenticator 136 is software that authenticates a user's identity for access to protected information, such as exemplary files 132, by presenting challenge questions to the user. However, unlike program function 138, authenticator 136 does not present challenge questions that are generated utilizing Semantic Web technology (discussed below). Authenticator 136 can access information included in exemplary information store 134. Authenticator 136 can receive instructions from program function 138. Authenticator 136 can allow authorized users to access information stored in exemplary information store 134.

Exemplary information store 140 is included in computing device 130 and is in communication with program function 138. Exemplary information store 140 is an information repository that includes confidence level files 144 and ontology files 142, in accordance with an embodiment of the present invention. Confidence level files 144 include predetermined information reflective of a particular user's required confidence level, such as a user of computing device 110. Confidence levels reflect the number of challenge questions, which are generated by program function 138, that a user must correctly answer to access protected information that is included in exemplary files 132. Ontology files 142 include ontology-based database files. In an embodiment, ontology files 142 are OWL-RDF formatted user responses. In certain embodiments, ontology files 142 are generated using the information included in user response files 133 and a Web Ontology Language (hereinafter "OWL"), such as OWL-RDF.

Figure 2:
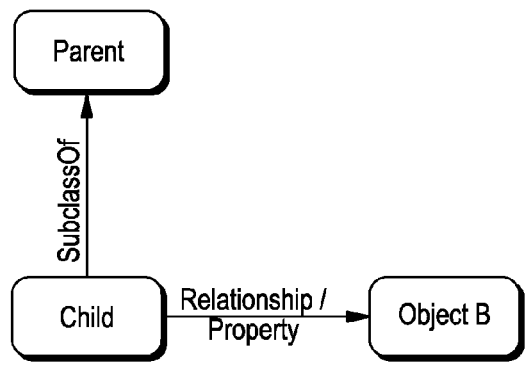
FIG. 2 depicts a graph representation of an example OWL-RDF data model, in accordance with an embodiment of the present invention.

OWL is a family of knowledge representation languages for authoring ontologies. The languages are characterized by formal semantics and RDF/XML-based serializations for the Semantic Web. Resource Description Framework (hereinafter "RDF") is a framework for representing information on the Web and is designed to represent information in a minimally constraining, flexible way by organizing information in a simple data model that is easy for applications to process and manipulate. FIG. 2 depicts a graph representation of an example OWL-RDF data model, in accordance with an embodiment of the present invention.

Specifically, FIG. 2 illustrates three (3) nodes, parent, child, and object B, wherein the child node is not only a subclass of the parent node, but also shares a particular relationship and/or property (hereinafter "predicate") with Object B. A further discussion of OWL-RDF data models is included in below.

Program function 138 is included in computing device 130 and is in communication with authenticator 136 and exemplary information store 140, in accordance with an embodiment of the present invention. Program function 138 is software that generates zero-knowledge proof-based challenge-response sets using Semantic Web technology. A zero-knowledge proof is a method by which one party can prove to another party that a given statement is true, without conveying any additional information apart from the fact that the statement is indeed true. Program function 138 can transmit instructions to authenticator 136. Program function 138 can access information included in exemplary information store 140, such as ontology files 142 and confidence level files 144. In an embodiment, program function 138 generates challenge-response sets using data generalization. Program function 138 can generalize attributes, such as numeric, string, sets, and sequenced-based attributes.

Numeric values can be generalized to a range, for example, 2012 may be generalized to a range of 2010-2019. Strings may be generalized using the characters contained therein and replacing them with ranges of characters, for example, "twelve" can be generalized to "*wel**", wherein "*" denotes any single character. Set-valued attributes, such as (7, 11, "abc"), may be generalized to (7, 10-19, "a**"). Sequence-valued attributes may be generalized in the same in the same fashion as set-valued attributes. However, unlike set-valued attributes whose orders do not matter, the order of sequence-valued attributes have to be kept consistent with the raw data.

In other embodiments, generalizations can be created using aggregations, such as average, count and maximum, which produce summary values for a set of values. Aggregations are useful for generalizing set-valued or sequence-valued attributes or set of attributes. In this way, a correct response from the user increases confidence that they are the authorized user, without revealing the real value of the attribute to potential eavesdroppers while protecting the privacy of the user at the same time. Given the generalization of an attribute, a challenge question can confirm the user's knowledge of the generalization instead of the raw data, such as the information that is included in user response files 133. Attributes should not be under-generalized, wherein the generalization of the attribute is similar to the actual value, which may not satisfy the user's privacy requirement and/or may result in divulging useful information to an eavesdropper.

In an embodiment, program function 138 can use generalization measures, such as instance size, full generalization, sensitivity and error rate, to generate challenge-response sets. Given an attribute A and its generalization A', the instance size of A' (hereinafter "[A']") is the number of valid attributes that match it. For example, given an integer-valued attribute, its generalization 10-19 has instance size 10 since 10 integers: 10, 11, 12 . . . 19 match the range. Given an attribute A, a full generalization of A (hereinafter "$A^{FG}$") is the generalization that covers all possible values of that attribute. For example, assuming a valid "age attribute" ranges from 1 to 120, $age^{FG}$ is 1-120 and $[A^{FG}]=120$. In other embodiments, sensitivity and error rate assume that attributes are independent of each other and attribute values are distributed uniformly.

Given an attribute A and its generalization A', we define Sensitivity of A' (denoted as S(A')) to be 1/[A']. Sensitivity measures how sensitive the generalization A' is relative to its raw data. The larger the sensitivity of A', the more sensitive A' is, or equivalently, the less generalized A' is. Sensitivity is measured in the range of 0 to 1. Likewise, given an attribute A and its generalization A', we define Sensitivity of A' (denoted as S(A')) to be 1/[A'].

For example, suppose A'=10-19 is a generalization of the age attribute, and the value of age ranges from 1 to 120, we have $S(A')=1/[A']=1/10$ and $E(A')=[A]/[A^{FG}]=10/120=1/12$. Continuing, $S(A')*E(A')=1/[A']*[A']/[A^{FG}]$, which is a constant for a given attribute A. Therefore, the larger the sensitivity of A', the smaller the error rate is, and vice versa. Intuitively, the closer A' is to its raw value, the less likely that it can be chosen at random. Similarly, we can define Error rate for a set of generalizations. Given a set of attributes: $A_1, A_2 \ldots A_k$ and their generalizations: $A_1', A_2' \ldots A_k'$, the error rate of $A_1', A_2' \ldots A_k'$ (denoted as $E(A1' \cap A2' \cap \ldots \cap Ak'))$ is defined as $[A_1']*[A_2']* \ldots *[A_k']/[A_1^{FG}]*[A_2^{FG}]* \ldots *[A_k^{FG}]$.

The error rate of a set of generalizations is the probability that the generalizations are selected at one time at random. Since attributes are independent, error rate is the product of the error rates of all of them. Because $E(A_i') \leq 1$ for i in [1, k], $E(A_1' \cap A_2' \cap \ldots \cap A_k')$ usually decreases as the number of attributes, k, increases. In other words, with the increase in the number of generalizations that the user chooses correctly, the chance that they are chosen based on pure luck decreases and the likelihood that they are the authorized user increases. In other embodiments, the generalization algorithm can be any selection algorithm that takes into consideration the values of Sensitivity and Error Rate. In still other embodiments, logical operators, such as AND, OR, and NOT, may be incorporated into challenge questions to allow for additional diversity.

Figure 3:
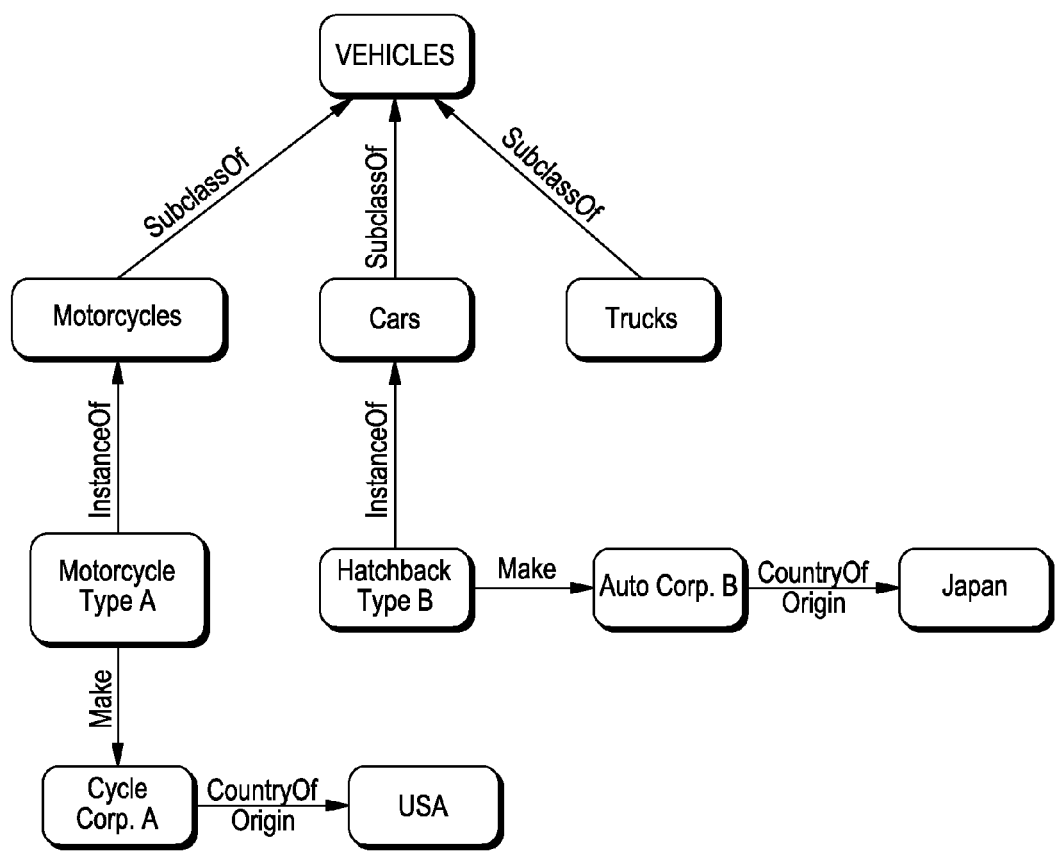
FIG. 3 depicts an ontology graph, in accordance with an embodiment of the present invention.

FIG. 3 depicts an ontology graph of information supplied by a user, in accordance with an embodiment of the present invention. Specifically, FIG. 3 depicts a ten node OWL-RDF graph model of a user's challenge response that is included in user response files 133. The graph includes a parent node, Vehicles, and three (3) child nodes, Motorcycles, Cars, and Trucks. A Motorcycle Type A node is a child node of the Motorcycles node and is associated with the Cycle Corporation A (hereinafter "CCA") node by a Make relationship. The CCA node also has a country of origin relationship with the USA node.

The Hatchback Type B node is an instance of the Cars node and is related to the Auto Corporation B (hereinafter "ACB") node by Make. The ACB node is also related to the Japan node by a country of origin relationship. When a user of computing device 110 attempts to access exemplary files 132, program function 138 accesses user related information that is included in ontology files 142. In an embodiment, during account registration, the user selects a password recovery secret object, wherein computing device 130 prompts the user with the following, "Select from the following category: your previous vehicle, favorite cartoon character, favorite animal or famous person." The user selects "previous vehicle" and provides the Year, Make and Model of the vehicle, 2008, ACB, Hatchback Type B, respectively. The OWL-RDF graph of the user's selection is reflected in FIG. 3.

Program function 138 the retrieves the secret object from ontology files 142 and determines associated OWL-RDF triples. Program function 138 selects a predicate (discussed above), such as manufacturer, fuel economy, and vehicle's country of origin and generates the challenge-response sets included in Table 1.

TABLE 1

| | Challenge | Response | Error Rate |
|---|---|---|---|
| 1 | What is the country of origin for the manufacturer of your secret object? | Japan | 1/30 countries |
| 2 | Name the manufacturer of your secret object | ACB | 1/n manufacturers in Japan |
| 3 | What is the highway fuel economy (mpg) of your secret object? | 35-37 mpg | 1/n range |

In an embodiment, program function 138 presents challenge question 1, 2, or 3 to the user, who has the ability to pick another challenge to respond to. For example, the user may be provided with the choice of skipping a particular challenge question, if they are not sure of the correct response. Subsequent to correctly responding to the challenge question, program function 138 retrieves the appropriate confidence level files that are associated with the user and determines whether the required confidence level has been achieved. In an embodiment, the correct response to a challenge question results in a particular amount of confidence level points. Program function 138 presents challenge questions to the user n-times until the required confidence level has been achieved. In an embodiment, program function 138 presents challenge questions to the user until a confidence level is achieved that is very unlikely to be random guesses and at the same time, not reveal the original secret. The error rate reflected in Table 1 defines the rate at which a non-authorized user is able to provide a correct response. For example, as per challenge 1, a non-authorized user has a one in thirty (1:30) chance of providing a correct response based on chance.

Figure 4:
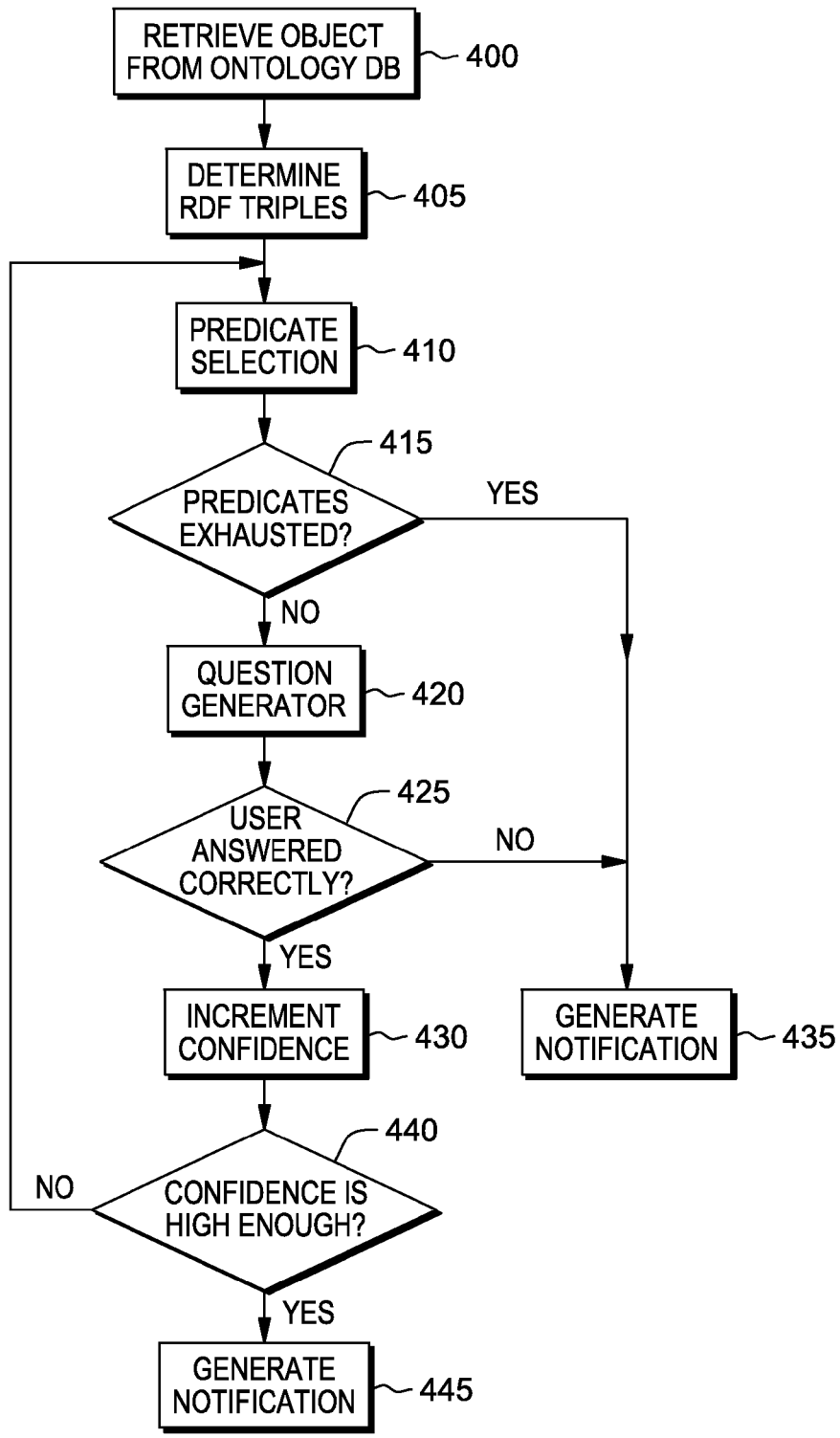
FIG. 4 depicts the operational steps of a program function, in accordance with an embodiment of the present invention.

FIG. 4 depicts the operational steps of program function 138, in accordance with an embodiment of the present invention. Program function 138 retrieves the secret object from the ontology database (step 400). Program function 138 determines OWL-RDF triples that are associated with the retrieved secret object (step 405). Program function 138 selects a predicate (step 410). If predicates for the object are exhausted ("yes" branch decisional 415), program function 138 generates a notification of the event (step 435). If the program function 138 determines that the associated predicates are not exhausted ("no" branch decisional 415), program function 138 generates a challenge-response set (step 420).

If program function 138 determines that the user did not answer the challenge question correctly ("no" branch decisional 425), program function 138 generates a notification of the event (step 435). If program function 138 determines that the user did answer the challenge question correctly ("yes" branch decisional 425), program function 138 increments the confidence level (step 430). If program function 138 determines that the confidence level is not high enough ("no" branch decisional 440), program function 138 returns to step 410. If program function 138 determines that the confidence level is high enough ("yes" branch decisional 440), program function 138 generates a notification that user is the authorized user (step 445).

Figure 5:
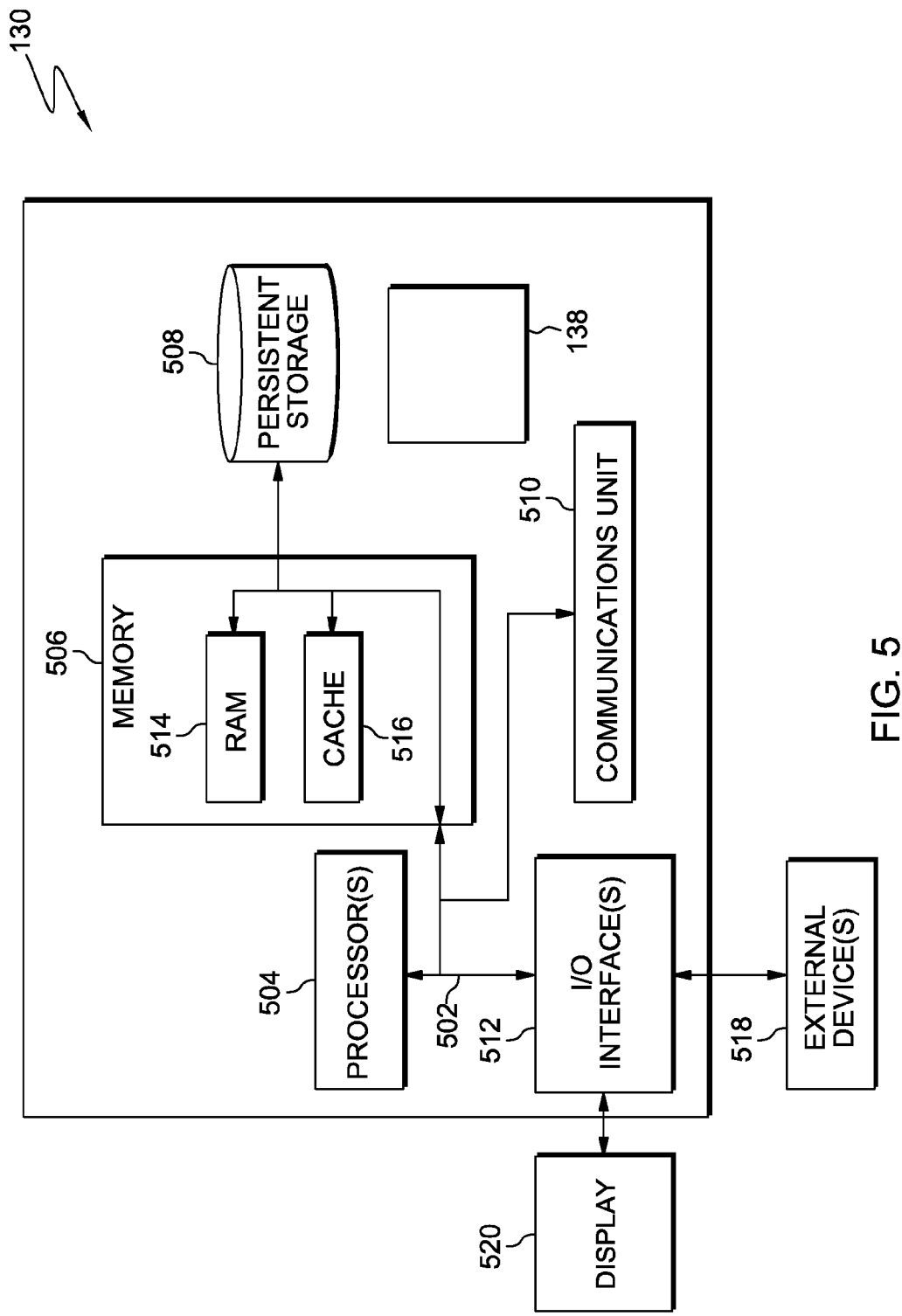
FIG. 5 depicts a block diagram of components of the computing device executing the program function, in accordance with an embodiment of the present invention.

FIG. 5 depicts a block diagram of components of computing device 130 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 130 includes communications fabric 402, which provides communications between computer processor(s) 404, memory 406, persistent storage 408, communications unit 410, and input/output (hereinafter "I/O") interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (hereinafter "RAM") 414 and cache memory 416. In general, memory 406 can include any suitable volatile or non-volatile computer-readable storage media.

Program function 138, authenticator 136, and exemplary information stores 134 and 140 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (hereinafter "ROM"), erasable programmable read-only memory (hereinafter "EPROM"), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 508.

Communications unit 410, in these examples, provides for communications with other data processing systems or devices, including computing device 110. In these examples, communications unit 410 includes one or more network interface cards. Communications unit 410 may provide communications through the use of either or both physical and wireless communications links. Program function 138 and authenticator 136 may be downloaded to persistent storage 408 through communications unit 410.

I/O interface(s) 412 allows for input and output of data with other devices that may be connected to computing device 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., program function 138 and authenticator 136, can be stored on such portable computer-readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for authenticating a user, the computer program product comprising a non-transitory computer readable storage medium having program code embodied therewith, the program code executable by a processor to:
   generate a first question for the user, with the first question requesting the user to select a secret entity;
   receive, from the user, an original response identifying the secret entity selected by the user, with the original response corresponding to a valid ontology object included in an ontology database;
   query the ontology database to determine a plurality of properties and classes of the valid ontology object corresponding to the secret entity; and
   generate, based upon a data generalization strategy using the plurality of properties and classes of the valid ontology object, a generated challenge and response set through the use of semantic web technology so that the generated challenge and response set is related semantically to the original user response and does not directly translate back to the original user response.

2. A computer system for authenticating a user, the computer system comprising:
   one or more computer processors;
   one or more non-transitory computer-readable storage media;
   program instructions stored on the computer-readable storage media for execution by at least one of the one or more processors to:
      generate a first question for the user, with the first question requesting the user to select a secret entity,
      receive, from the user, an original response identifying the secret entity selected by the user, with the original response corresponding to a valid ontology object included in an ontology database,
      query the ontology database to determine a plurality of properties and classes of the valid ontology object corresponding to the secret entity, and
      generate, based upon a data generalization strategy using the plurality of properties and classes of the valid ontology object, a generated challenge and response set through the use of semantic web technology so that the generated challenge and response set is related semantically to the original user response and does not directly translate back to the original user response.

3. The computer program product of claim 1 wherein the program code is further executable by a processor to:
   communicate the a challenge portion of the generated challenge and response set to the user;
   receive a secondary response from the user;
   compare the secondary response to a response portion of the generated challenge and response set to determine whether there is a match; and
   taking an authentication-related action based upon whether there is a match.

4. The computer program product of claim 3 wherein:
   the comparison of the secondary response to the response portion of the generated challenge and response set determines that there is a match; and
   the authentication-related action is successful authentication of the user.

5. The computer system of claim 2 wherein the program instructions stored on the computer-readable storage media are further executable by at least one of the one or more processors to:
   communicate the a challenge portion of the generated challenge and response set to the user;
   receive a secondary response from the user;
   compare the secondary response to a response portion of the generated challenge and response set to determine whether there is a match; and
   taking an authentication-related action based upon whether there is a match.

6. The computer system of claim 5 wherein:
   the comparison of the secondary response to the response portion of the generated challenge and response set determines that there is a match; and
   the authentication-related action is successful authentication of the user.

* * * * *